US005442361A

United States Patent [19]

Peters et al.

[11] Patent Number: 5,442,361
[45] Date of Patent: Aug. 15, 1995

[54] MICROWAVE TRANSCEIVER USING A REFLECTION PUMPED MIXER

[75] Inventors: Steven J. Peters, Renton; Kenneth G. Voyce, Bellevue, both of Wash.

[73] Assignee: The Boeing Company, Seattle, Wash.

[21] Appl. No.: 184,535

[22] Filed: Jan. 21, 1994

[51] Int. Cl.⁶ .............................................. G01S 13/08
[52] U.S. Cl. .................................. 342/128; 342/122
[58] Field of Search .............................. 392/122, 128

[56] References Cited

U.S. PATENT DOCUMENTS 5,153,546 10/1992 Stove ............................ 342/128 X
5,280,290 1/1994 Evans .............................. 342/128

*Primary Examiner*—Mark Hellner
*Attorney, Agent, or Firm*—Kenneth J. Cooper; Mary Y. Redman

[57] ABSTRACT

A microwave transceiver using a reflection pumped mixer includes an electromagnetic signal generator, a subreflector, a reflector of electromagnetic signals from the subreflector, a mixer, circulator, and processing circuitry to relate electromagnetic signal frequency differences to the range of a target from the transceiver. Such frequency differences are detected by the mixer from the captured electromagnetic signals reflected distant targets and reflected electromagnetic signals from the subreflector.

3 Claims, 2 Drawing Sheets

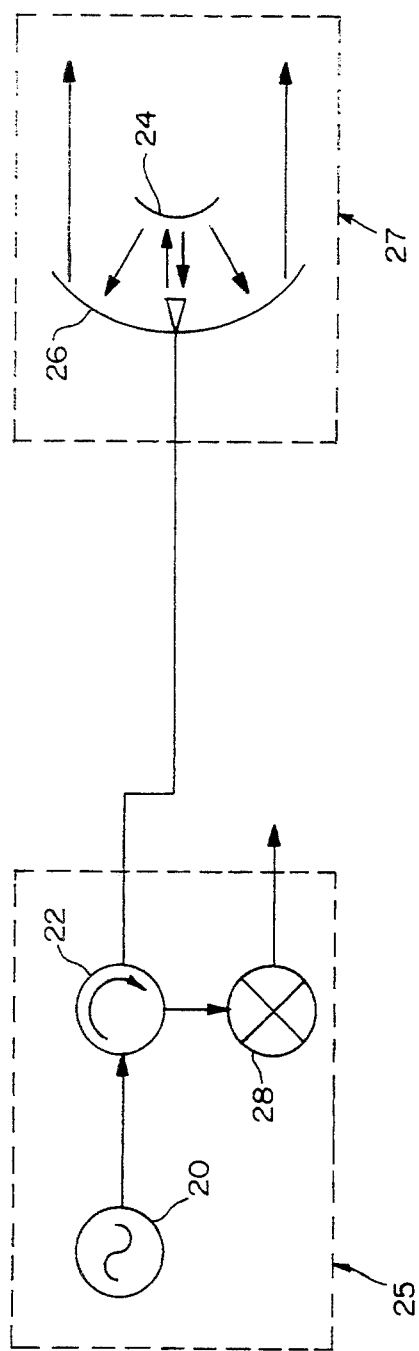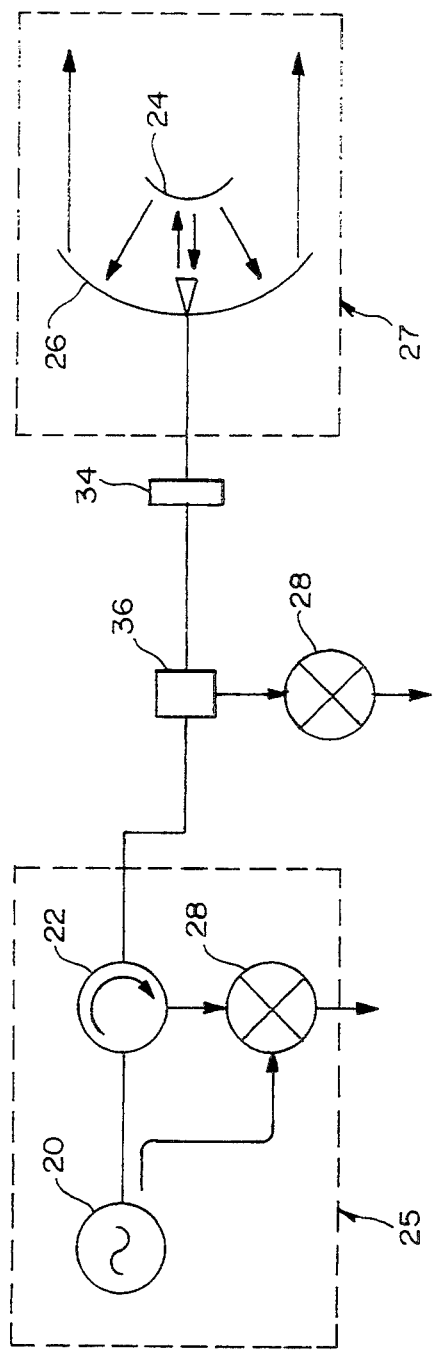

MICROWAVE TRANSCEIVER USING A REFLECTION PUMPED MIXER

BACKGROUND AND SUMMARY OF THE INVENTION

The invention relates to a transceiver which minimizes self jamming from reflected electromagnetic signals.

Radar system performance is degraded by electromagnetic signal reflection off a Casagrain antenna's subreflector. That reflection "self jams" the radar by increasing the receiver's noise floor. This noise floor limits the radar's ability to discriminate low-level reflections off distant objects from the higher intensity electromagnetic signals reflected from the subreflector. Minimizing that noise floor, therefore, improves the performance of the radar.

Past radar system designs sought to minimize "self jamming" signals from antenna reflections. One approach, a Frequency Modulated Continuous Wave radar system, matched the length, of transmission lines from the radar's transmitter and local oscillator to the front-end mixer. The mixer would then detect the arrival of the signals and thereby their phase noise. A voltage controlled oscillator 20 (FIG. 1) transmitted an electromagnetic signal to circulator 22. The circulator 22 allowed signal transmission only to the next downstream circuit component, the subreflector 24. Subreflector 24 reflected some electromagnetic signals to reflector 26 and some signals back to circulator 22. Electromagnetic signals reflected from reflector 26 ventured to a distant target. The target reflected some of those signals back to reflector 26. Reflector 26, in turn, reflected some of those captured signals to subreflector 24 which, in turn, reflected some of those signals to circulator 22. Circulator 22 directed signals, received from reflector 24, to mixer 28. Mixer 28 detected the frequency difference between the signal of voltage controlled oscillator 20 and the signal received from circulator 22. That frequency difference output from mixer 28 was proportional to the distance between the radar and the target. The mixer input from voltage controlled oscillator 20 traveled along a transmission line 29 having a length sufficient to generate a time delay in that mixer input. The time delay was equal to the round trip propagation time of the "self jamming" electromagnetic signal reflected from the subreflector 24 during signal transmissions. This time delay "matching" reduced the detection of phase noise by mixer 28, minimized the "self jamming" of the radar, and thereby allowed detection of more distant targets with lower signal transmission power.

An alternative approach to minimizing electromagnetic signal "self jamming" has been to alter the shape of subreflector 24. The purpose of the different shape was to produce an electromagnetic field "hole" 32 (FIG. 2) in the electromagnetic field of the main reflector 26 to minimize an energy path back to mixer 28.

The above described alternative designs still allow some amount of "self jamming" signal from the subreflector to contaminate the radar signal processing circuitry. The invention, rather than eliminating the "self jamming" signal reflections, uses them as the local oscillator for the mixer and eliminates the need for another local oscillator input to the mixer.

SUMMARY OF THE INVENTION

The invention is an electromagnetic signal transceiver configured to minimize the effect of signal "self jamming" from the antenna of a radar system. A voltage controlled oscillator transmits a stream of electromagnetic signals to a circulator. The circulator transmits those signals to the radar system's subreflector. Some of those signals are reflected to the radar's reflector for further transmission to a distant target. Some of the electromagnetic signals reflect from the subreflector back to the circulator to create "self jamming" signals for the transceiver. The invention directs the transmitted signals, reflected from the subreflector, to the circulator and then to a mixer. The mixer detects the frequency difference of the transmitter reflected signals and the electromagnetic signals reflected and captured from the distant target. Electrically downstream signal processing circuitry interprets that frequency difference to yield the range of the target from the electromagnetic signal generator.

An object of the invention is to increase the sensitivity of radar systems for detecting distant targets. A second object is to increase the range of target detection by radar systems. A third object is to simplify the circuitry of radar systems. A fourth object is to decrease radar system design and manufacturing costs. A fifth object is to detect more distant objects with higher transmission power without degrading the captured signals from the target with the self jamming signals from the signal transmitter.

A feature of the invention is an electronic mixer having, as inputs, reflected electromagnetic signals from the antenna and from a distant target. The frequency difference between the two input signals is proportional to the range of the target from the antenna.

BRIEF DESCRIPTION OF THE DRAWINGS

FIG. 3 is a schematic representation of the invention.

FIG. 4 is a block diagram of a two channel transceiver system.

DETAILED DESCRIPTION

Figure 1:
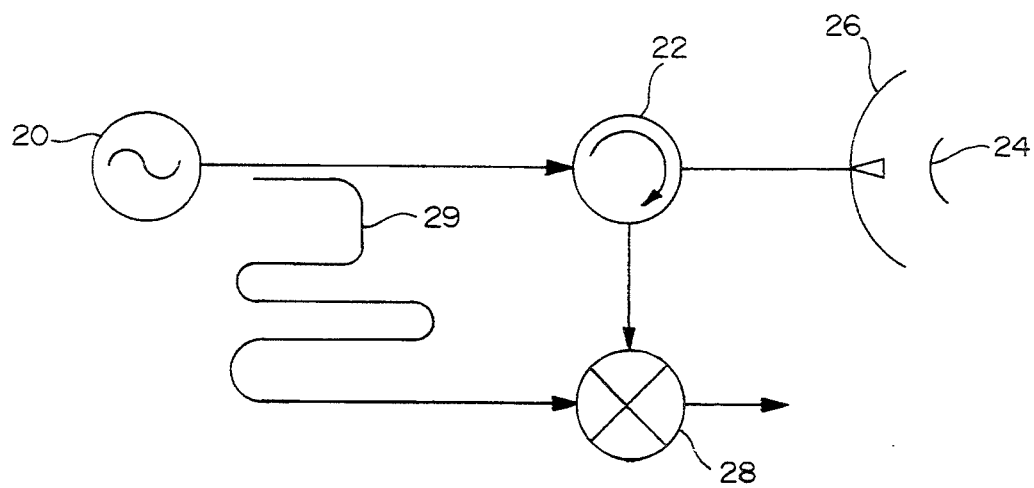
FIG. 1 depicts circuitry for a conventional Frequency Modulated Continuous Wave radar system.

A transceiver 25 (FIG. 3) is designed to transmit and receive electromagnetic signals. The transmitted signal exits transceiver 25 into antenna 27 and then to the surrounding atmosphere. When the electromagnetic signal strikes an object, portions of that electromagnetic signal reflect back towards antenna 27. The received electromagnetic signal is then processed by circuitry in the transceiver 25.

Voltage controlled oscillator 20 (FIG. 3) generates an electromagnetic signal for transmission to a distant target. The electromagnetic signal is conducted to a circulator 22 which is designed to transmit received electromagnetic signals only to the next electrically downstream circuit element, namely subreflector 24. The transmitted electromagnetic signals strike subreflector 24. Portions of those electromagnetic signals reflect off subreflector 24, impinge reflector 26, and reflect toward a distant target. Other portions of the transmitted electromagnetic signals, after impinging on subreflector 24, reflect directly back to circulator 22. These reflected transmitted electromagnetic signals cause "self jamming" of the transceiver.

"Self jamming" results when the transmitted electromagnetic signals reflected from subreflector 24 are reflected back to circulator 22. These captured electromagnetic signals are detected by signal processing circuitry which also processes the electromagnetic signal transmission reflected back from a distant target. The difference in frequency between the captured electromagnetic signal from the target and the reflected electromagnetic signal transmission may be interpreted to yield the range of the distant target from antenna 27. Mixer 28 detects that signal frequency difference. That difference is transmitted to electrically downstream signal processing circuitry for relating that difference to the target's range.

Figure 2:
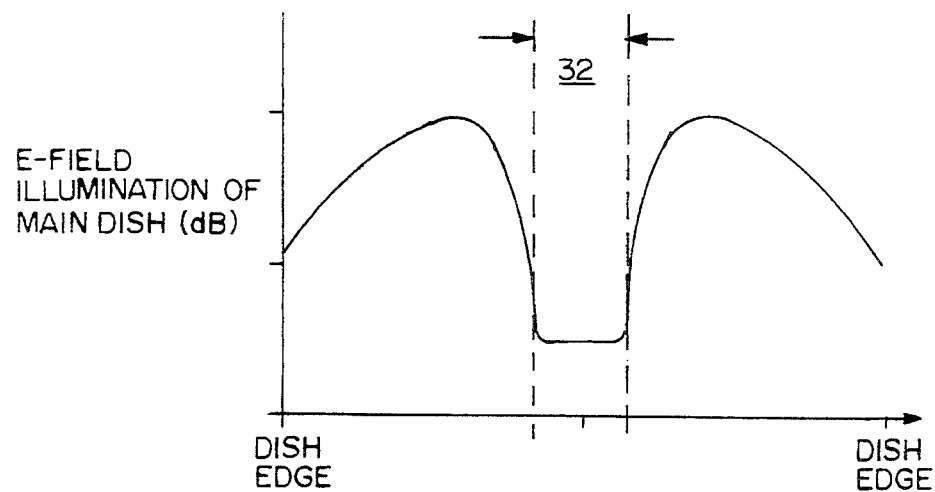
FIG. 2 graphically depicts the effect of a subreflector have a modified shape to create an electromagnetic field "hole" which minimizes electromagnetic "self jamming" of the radar system.

The invention can minimize "self jamming" in a two channel, dual circularly polarized radar system (FIG. 4). Transceiver 25 transmits a single polarization electromagnetic signal to polarizer 34 for conversion from linear to circular polarization. The circular polarized signal reflects off subreflector 24 to reflector 26. Reflector 26 directs the transmitted circular polarized electromagnetic signal to a distant target which reflects some of that signal back to antenna 27. The reflected signal from the target includes the polarization of the originally transmitted signal and the orthogonal polarization of the originally transmitted signal. Antenna 27 captures and transmits the signal through polarizer 34 to polarization diplexer 36 which splits the signal into separate paths. Polarization diplexer 36 sends the captured signal having one polarization to mixer 28. Polarization diplexer 36 sends the captured signal having the orthogonal polarization to circulator 22 then to mixer 38. Mixer 38 compares its captured signal to a signal from voltage controlled oscillator 20 similar to the one in the radar system illustrated in FIG. 2. Mixer 28 compares its captured signal to the portion of the originally transmitted electromagnetic signal which reflected off subreflector 24, changed its polarization upon reflection, and emerged from polarization diplexer 34.

We claim:

1. A radar system comprising:

a generator of electromagnetic signals for transmission to a target;

means for capturing electromagnetic signals reflected from the target;

means for detecting a frequency difference between captured electromagnetic signals reflected from the target and electromagnetic signals reflected from the means for capturing electromagnetic signals; and means for interpreting the frequency difference to determine the range of a target from the electromagnetic signal generator;

wherein the means for capturing electromagnetic signals reflected from the target comprises:

a reflector; and a subreflector, the reflector having the reflected electromagnetic signals focused on the subreflector and the subreflector reflecting electromagnetic signals from the generator of electromagnetic signals to the reflector and from the reflector to the means for detecting a frequency difference between captured electromagnetic signals and electromagnetic signals reflected from the subreflector.

2. A radar system comprising:

a generator of electromagnetic signals for transmission to a target;

means for capturing electromagnetic signals reflected from the target;

means for detecting a frequency difference between captured electromagnetic signals reflected from the target and electromagnetic signals reflected from the means for capturing electromagnetic signals; and means for interpreting the frequency difference to determine the range of a target from the electromagnetic signal generator;

wherein the means for detecting a frequency difference between captured electromagnetic signals reflected from the target and the electromagnetic signals reflected from the means for capturing electromagnet signals comprises:

a circulator; and a mixer, the circulator transmitting electromagnetic signals from the generator to the means for capturing electromagnetic signals and from the means for capturing electromagnetic signals to the mixer; the mixer detecting the frequency difference between an electromagnetic signal from the target and from the means for capturing electromagnetic signals.

3. A target range detector comprising:

an electromagnetic signal generator;

a subreflector;

a reflector of electromagnetic: signals from the subreflector and electromagnetic signals reflected from a target and the subreflector for reflecting electromagnetic signals from the electromagnetic signal generator and from the reflector;

a mixer for detecting and transmitting an electromagnetic signal frequency difference between the electromagnetic signal reflected from the target and the electromagnetic signal reflected from the subreflector;

a circulator for transmitting an electromagnetic signal from the electromagnetic signal generator to the subreflector and for transmitting a reflected electromagnetic signal from the subreflector to the mixer; and means for processing the electromagnetic signal from the mixer to relate the electromagnetic signal frequency difference to the range of a target from the electromagnetic signal generator.

* * * * *